(12) United States Patent  (10) Patent No.: US 8,346,432 B2
Van Wiemeersch et al.  (45) Date of Patent: Jan. 1, 2013

(54) SYSTEM AND METHOD FOR REMOTELY CONTROLLING VEHICLE COMPONENTS FROM A NOMADIC COMMUNICATION DEVICE OR COMPUTER

(75) Inventors: John Robert Van Wiemeersch, Novi, MI (US); Robert Bruce Kleve, Farmington, MI (US); Steven Yellin Schondorf, Dearborn, MI (US); Thomas Lee Miller, Ann Arbor, MI (US); Brian Bennie, Sterling Heights, MI (US); Dae Wook Kwon, Troy, MI (US); Paul Aldighieri, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 630 days.

(21) Appl. No.: 12/565,228

(22) Filed: Sep. 23, 2009

(65) Prior Publication Data

US 2011/0071734 A1    Mar. 24, 2011

(51) Int. Cl.
*G06F 19/00* (2006.01)
(52) U.S. Cl. ........... 701/36; 701/2; 701/49; 340/426.13; 340/426.15
(58) Field of Classification Search .................. None
See application file for complete search history.

(56) References Cited

U.S. PATENT DOCUMENTS

| | | | |
|---|---|---|---|
| 4,804,937 A | 2/1989 | Barbiaux et al. | |
| 5,355,511 A | 10/1994 | Hatano et al. | |
| 5,432,841 A | 7/1995 | Rimer | |
| 5,732,074 A | 3/1998 | Spaur | |
| 5,758,300 A | 5/1998 | Abe | |
| 5,889,468 A | 3/1999 | Banga | |
| 5,942,979 A | 8/1999 | Luppino | |
| 5,943,206 A | 8/1999 | Crayford | |
| 5,963,129 A | 10/1999 | Warner | |
| 5,986,543 A | 11/1999 | Johnson | |
| 5,993,397 A | 11/1999 | Branson | |
| 6,037,676 A | 3/2000 | Foree | |
| 6,067,009 A | 5/2000 | Hozuka et al. | |
| 6,104,931 A | 8/2000 | Havinis et al. | |

(Continued)

FOREIGN PATENT DOCUMENTS

DE   10225787 A1 * 12/2003

OTHER PUBLICATIONS

Solindo GPS, Solindo Web Products: The Solutions Provider Company. Printout from www.solindoweb.com/products.php on Sep. 16, 2009, pp. 1-4.

(Continued)

*Primary Examiner* — Michael J. Zanelli
(74) *Attorney, Agent, or Firm* — Jennifer M. Stec; Brooks Kushman P.C.

(57) ABSTRACT

A method for remotely controlling one or more vehicle components includes receiving over a telecommunications network signals originating from a remote terminal. The signals include remote operation instructions for remotely operating a vehicle entertainment system component. The remote operation instructions are executed. Operation status identifiers transmitted over a vehicle data bus are received from the vehicle entertainment system component. Based on the operation status identifiers, an operating status of the vehicle entertainment system component is determined. A return signal including an operation status message and an instruction for displaying the operation status message at the remote terminal is generated. The signal is transmitted to the remote terminal for display.

20 Claims, 5 Drawing Sheets

U.S. PATENT DOCUMENTS

| | | |
|---|---|---|
| 6,295,449 B1 | 9/2001 | Westerlage et al. |
| 6,339,736 B1 | 1/2002 | Moskowitz et al. |
| 6,343,220 B1 | 1/2002 | Van Der Salm |
| 6,370,472 B1 | 4/2002 | Fosseen |
| 6,415,210 B2 | 7/2002 | Hozuka et al. |
| 6,429,773 B1* | 8/2002 | Schuyler .................... 340/425.5 |
| 6,435,018 B1 | 8/2002 | Murakami et al. |
| 6,441,732 B1 | 8/2002 | Laitsaari et al. |
| 6,470,732 B1 | 10/2002 | Breton |
| 6,487,478 B1 | 11/2002 | Azzaro et al. |
| 6,525,643 B1 | 2/2003 | Okada et al. |
| 6,571,617 B2 | 6/2003 | Van Nierkerk et al. |
| 6,587,040 B2 | 7/2003 | Seto |
| 6,611,740 B2 | 8/2003 | Lowrey et al. |
| 6,612,165 B2 | 9/2003 | Juzswik et al. |
| 6,629,031 B2 | 9/2003 | Gustavsson et al. |
| 6,691,025 B2 | 2/2004 | Reimer |
| 6,732,031 B1 | 5/2004 | Lightner et al. |
| 6,738,697 B2 | 5/2004 | Breed |
| 6,825,758 B1 | 11/2004 | Laitsaari |
| 6,839,614 B1 | 1/2005 | Timko et al. |
| 6,845,314 B2 | 1/2005 | Fosseen |
| 6,847,872 B2 | 1/2005 | Bodin et al. |
| 6,853,853 B1 | 2/2005 | Van Wiemeersch et al. |
| 6,892,052 B2 | 5/2005 | Kotola et al. |
| 6,937,141 B2 | 8/2005 | Muramatsu |
| 6,983,200 B2 | 1/2006 | Bodin et al. |
| 6,993,421 B2 | 1/2006 | Pillar et al. |
| 7,053,761 B2 | 5/2006 | Schofield et al. |
| 7,068,158 B2 | 6/2006 | Komatsu et al. |
| 7,114,379 B2 | 10/2006 | Emord |
| 7,171,188 B1 | 1/2007 | Watanabe et al. |
| 7,216,532 B2 | 5/2007 | Rimkus et al. |
| 7,218,209 B2 | 5/2007 | Utter et al. |
| 7,219,063 B2 | 5/2007 | Schalk et al. |
| 7,224,262 B2 | 5/2007 | Simon et al. |
| 7,228,122 B2 | 6/2007 | Oyagi et al. |
| 7,319,378 B1 | 1/2008 | Thompson et al. |
| 7,379,541 B2 | 5/2008 | Iggulden et al. |
| 7,394,352 B2 | 7/2008 | Bell et al. |
| 7,509,849 B2 | 3/2009 | Rutherford et al. |
| 7,778,186 B2 | 8/2010 | Oman et al. |
| 7,849,149 B2 | 12/2010 | Habaguchi et al. |
| 7,859,392 B2 | 12/2010 | McClellan et al. |
| 8,061,879 B2 | 11/2011 | Simmons et al. |
| 2001/0033225 A1 | 10/2001 | Razavi et al. |
| 2003/0016130 A1* | 1/2003 | Joao ............................. 340/539 |
| 2003/0093218 A1 | 5/2003 | Jones |
| 2003/0205081 A1 | 11/2003 | Proschka |
| 2004/0050188 A1 | 3/2004 | Richards et al. |
| 2004/0193368 A1 | 9/2004 | Sanqunetti |
| 2005/0179518 A1 | 8/2005 | Kawamura et al. |
| 2005/0195106 A1* | 9/2005 | Davis et al. ............. 342/357.08 |
| 2005/0273218 A1 | 12/2005 | Breed et al. |
| 2006/0208865 A1 | 9/2006 | Quach et al. |
| 2006/0220806 A1* | 10/2006 | Nguyen .................. 340/426.36 |
| 2006/0220813 A1 | 10/2006 | Utter et al. |
| 2006/0235652 A1 | 10/2006 | Rimkus et al. |
| 2006/0273885 A1 | 12/2006 | Thompson |
| 2006/0288101 A1 | 12/2006 | Mastrodonato et al. |
| 2007/0015548 A1 | 1/2007 | Flick |
| 2007/0060056 A1 | 3/2007 | Whitaker et al. |
| 2007/0155300 A1 | 7/2007 | Hsieh |
| 2007/0156317 A1 | 7/2007 | Breed |
| 2007/0193348 A1 | 8/2007 | Rutherford et al. |
| 2007/0200671 A1 | 8/2007 | Kelley et al. |
| 2007/0229350 A1 | 10/2007 | Scalisi et al. |
| 2007/0290881 A1 | 12/2007 | Nikitin et al. |
| 2008/0046149 A1 | 2/2008 | Breed |
| 2008/0077292 A1 | 3/2008 | Gisler |
| 2008/0082221 A1 | 4/2008 | Nagy |
| 2008/0106859 A1 | 5/2008 | Eguchi et al. |
| 2008/0125665 A1 | 5/2008 | Nigam |
| 2008/0136611 A1 | 6/2008 | Benco et al. |
| 2008/0147265 A1 | 6/2008 | Breed |
| 2008/0147271 A1 | 6/2008 | Breed |
| 2008/0197970 A1 | 8/2008 | Fouts |
| 2008/0204556 A1 | 8/2008 | de Miranda |
| 2008/0215665 A1 | 9/2008 | Appleby et al. |
| 2008/0228355 A1 | 9/2008 | de Jonk et al. |
| 2008/0266051 A1* | 10/2008 | Taki et al. ...................... 340/5.1 |
| 2008/0299961 A1 | 12/2008 | Muller et al. |
| 2008/0309451 A1 | 12/2008 | Zellweger et al. |
| 2009/0075624 A1 | 3/2009 | Cox et al. |
| 2009/0091437 A1 | 4/2009 | Corniot |
| 2009/0096575 A1 | 4/2009 | Tieman |
| 2009/0096596 A1 | 4/2009 | Sultan et al. |
| 2009/0098907 A1 | 4/2009 | Huntzicker et al. |
| 2009/0167524 A1 | 7/2009 | Chesnutt et al. |
| 2009/0273438 A1* | 11/2009 | Sultan et al. .................... 340/5.7 |
| 2010/0233957 A1* | 9/2010 | Dobosz ....................... 455/41.1 |
| 2011/0071720 A1 | 3/2011 | Schondorf et al. |
| 2011/0071734 A1 | 3/2011 | Van Wiemeersch et al. |

OTHER PUBLICATIONS

J. Smith, Wanted: One Gorilla, printed from www.tirereview.com, Jul. 27, 2009.

Check Tire Pressure with Bluetooth, printed from www.esato.com, Jul. 30, 2004.

Acumine PTY LTD—Fleet Monitoring System, http://www.acumine.com/_Products/Fleet Monitoring.php., May 22, 2009.

Vehicle monitoring system, GPS vehicle monitoring system. Vehicle tracking system. http://www.guardmagic.com/, May 22, 2009.

911 Assist, Vehicle Health Report Expand Sync Capabilities and Convenience Features, printout from www.media.ford.com.

Vehicle Health Report Delivers Assistance With Vehicle Maintenance and Monitoring, printout from www.media.ford.com.

* cited by examiner

SYSTEM AND METHOD FOR REMOTELY CONTROLLING VEHICLE COMPONENTS FROM A NOMADIC COMMUNICATION DEVICE OR COMPUTER

BACKGROUND

1. Technical Field

Various embodiments include a system and method for controlling one or more vehicle components from a nomadic communication device or computer.

2. Background

Using a vehicle key fob, users can lock or unlock a vehicle, open a trunk, or remotely start a vehicle. Some key fobs are increasingly becoming more advanced. Along with these traditional benefits, using a more advanced key fob, users can check if the vehicle's doors are locked or the window's are closed, confirm the alarm status, or obtain vehicle information such as odometer readings, fuel level and cabin temperature.

Traditional key fobs require a user to be within a certain distance of the vehicle generally about 300 feet. Furthermore, a key fob is yet another personal item that must be carried by a user along with wallets, mobile devices, briefcases, purses and other items.

SUMMARY

One aspect includes a computer-implemented method for remotely controlling one or more vehicle components. The method includes receiving over a telecommunications network one or more first signals originating from a nomadic device (ND). The one or more first signals may include one or more remote operation instructions including at least one instruction for remotely operating a vehicle entertainment system component. The method further includes executing the one or more remote operation instructions.

The method may also include receiving one or more operation status identifiers transmitted over a vehicle data bus from a vehicle entertainment system component. Based on the one or more operation status identifiers, an operating status of the vehicle entertainment system component may be determined.

The method may include generating at least one second signal including at least one operation status message and at least one instruction for displaying the operation status message at the ND. The method also includes transmitting the at least one second signal to the at least one remote ND for display.

In one embodiment, the remote operation instruction includes at least one media source selection instruction. Accordingly, the operation status message may include a message that the selected media source is being remotely operated. The media source may include a radio, a compact disc player, a tape player, a digital video disc (DVD) player, and a personal media player.

The at least one remote operation instruction may also include at least one volume level selection instruction. The operation status message may include a message identifying the volume at which the one or more media items are being played.

The volume level selection may be a user-defined predetermined selection from the ND. Accordingly, the at least one volume level selection instruction may include an instruction to play the one or more media items according to the user's predetermined selection.

In one embodiment, the remote operation instructions may include instructions for remotely operating at least one other vehicle component. The at least one other component may include an audible vehicle locator system which may be operated according to a user preference. Other components may include a vehicle seat heating system component, a vehicle seat positioning system component, a vehicle double locking system component, and a hazard lighting system component.

In one embodiment, the method may further include performing the method with respect to the at least one other component.

Another aspect includes a computer-implemented system for remotely controlling one or more vehicle components. The system may include a cellular communication device within a vehicle. The cellular communication device may communicate with one or more remote terminals over a telecommunications network. Furthermore, the cellular communication device may be configured to receive one or more first signals originating from the one or more remote terminals. The one or more first signals may include one or more remote operation instructions including at least one instruction for remotely operating a vehicle entertainment system component.

The cellular communication device may be further configured to transmit the one or more remote operation instructions for execution. The at least one instruction may be executed by a vehicle.

In one embodiment, the one or more remote operation instructions may include at least one instruction for controlling one or more features of the vehicle entertainment system. The one or more features of the vehicle entertainment system includes at least one of a volume control feature, a radio scan feature, a track selection feature, a channel selection feature, a play feature, and a stop feature.

The cellular communication device may be further configured to receive one or more operation status identifiers transmitted over a vehicle data bus from a vehicle entertainment system component. Based on the one or more operation status identifiers, the cellular communication device may be further configured to determine an operating status of at least the vehicle entertainment system component.

The cellular communication device may be further configured to generate at least one second signal. The second signal may include at least one operation status message and at least one instruction for displaying the operation status message at one or more remote terminals. Additionally, the cellular communication device may be configured to transmit the at least one second signal to the one or more remote terminals for display. The remote terminals may be a nomadic device (ND) or a personal computer (PC).

In one embodiment, the one or more remote operation instructions may further includes at least one instruction for remotely operating at least one other vehicle component. Accordingly, the cellular communication module may be further configured to operate with respect to the at least one other component.

Another aspect includes a computer-implemented system for remotely controlling one or more vehicle components. The computer-implemented system may include one or more servers in communication with one or more remote terminals over a telecommunications network. The one or more servers may be configured to receive input defining one or more first operation status identifiers. The servers may be further configured to receive one or more first signals originating from the one or more remote terminals. The one or more first signals may include one or more remote operation instructions including at least one instruction for remotely operating a vehicle entertainment system component.

The servers may be further configured to transmit the one or more remote operation instructions for execution by a vehicle. The servers may be further configured to receive one or more second operation status identifiers from the vehicle pertaining to the vehicle entertainment system component. The one or more second operation status identifiers may originate from a vehicle data bus.

The servers may be further configured to process the one or more second operation status identifiers based on the one or more first operation status identifiers. The servers may be further configured to determine an operation status of at least the vehicle entertainment system component based on the processing step.

The servers may be further configured to generate at least one second signal. The second signal may include at least one operation status message and at least one instruction for displaying the operation status message at the one or more remote terminals. Additionally, the servers may be further configured to transmit the at least one second signal to the one or more remote terminals for display. The one or more terminals may be one or more nomadic devices.

These and other aspects of the present invention will be better understood in view of the attached drawings and following detailed description of the invention.

BRIEF DESCRIPTION OF THE DRAWINGS

The figures identified below are illustrative of some embodiments of the present invention. The figures are not intended to be limiting of the invention recited in the appended claims. Embodiments of the present invention, both as to their organization and manner of operation, together with further object and advantages thereof, may best be understood with reference to the following description, taken in connection with the accompanying drawings, in which:

DETAILED DESCRIPTION

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
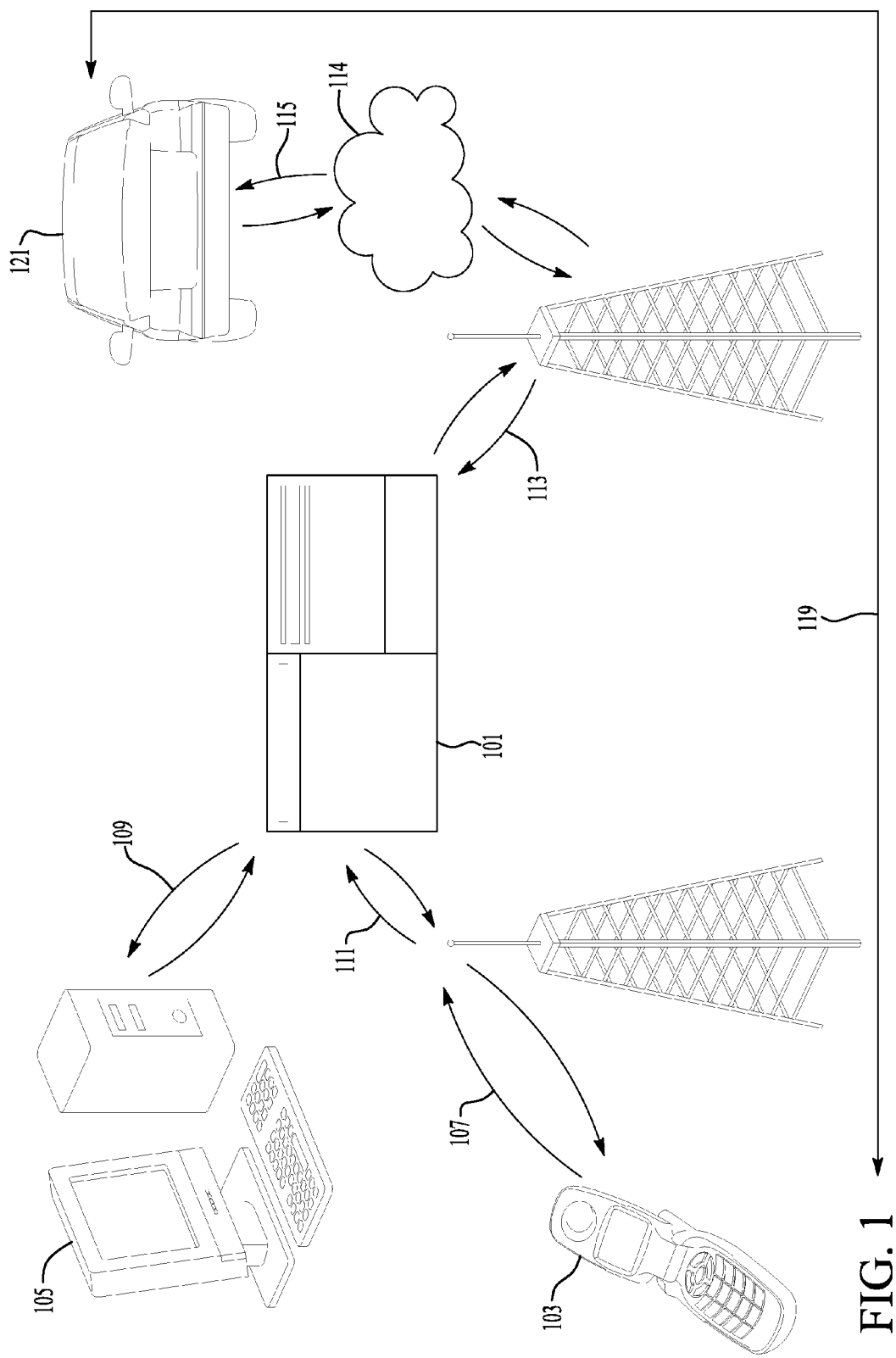
FIG. 1 shows an illustrative example of a communication system through which a nomadic device can communicate with a vehicle according to one of the various embodiments.

FIG. 1 shows an illustrative example of a communication system through which a nomadic device can communicate with a vehicle 121. In this illustrative embodiment, a nomadic device (e.g., without limitation, a cellular phone) 103 is used to send a communication through a cellular network 107. This communication is relayed through a network 111 (e.g., without limitation, the cellular network, the internet, etc.) to a centralized system 101. A system similar to the system shown in FIG. 1 is available from CRAYON INTERFACE, INC.

In this illustrative embodiment, the centralized system is a server system that includes processing capability for incoming nomadic device signals designated to interact with a remote vehicle 121.

For example, the server(s) 101 may include an automated call server and/or web host. Further, the server(s) 101 may route an incoming signal from a nomadic device (ND) 103 to the appropriate remote vehicle. Data sent in this fashion may be sent using data-over-voice, a data-plan, or in any other suitable format.

Data can also be sent to the remote vehicle 121 through the server(s) 101 using a personal computer 105. In this case, the data is likely, although not necessarily, sent over the internet 109.

Once the server(s) 101 receive the incoming data request from the remote source 103, 105, the message is processed and/or relayed to a vehicle 121. The vehicle may be identified by a header associated with one or more incoming data packets, or may be identifiable based on a database lookup, for example.

The relay to the vehicle 121 is sent out from the server(s) 101 through a network (e.g., without limitation, a cellular network 113, the internet, etc.) and passed through a cellular network 115 to the vehicle 121. In one embodiment, the relay may additionally be passed through a broadband network 114 (e.g., 802.11g or WiMax). A remote communication module 200 in the vehicle 121 receives the signal sent from the server(s) 101 and processes it or relays it to an appropriate processing system within the vehicle 121.

In at least one illustrative embodiment, the vehicle 121 is also outfitted with a communication transceiver, such as, but not limited to, a BLUETOOTH transceiver. This transceiver may allow communication with the nomadic device 103 using a direct signal 119 if, for example, cellular networks are unavailable.

FIGS. 2a-d show illustrative examples of vehicle-based communication modules that provide communication to a remote network.

Figure 2A:
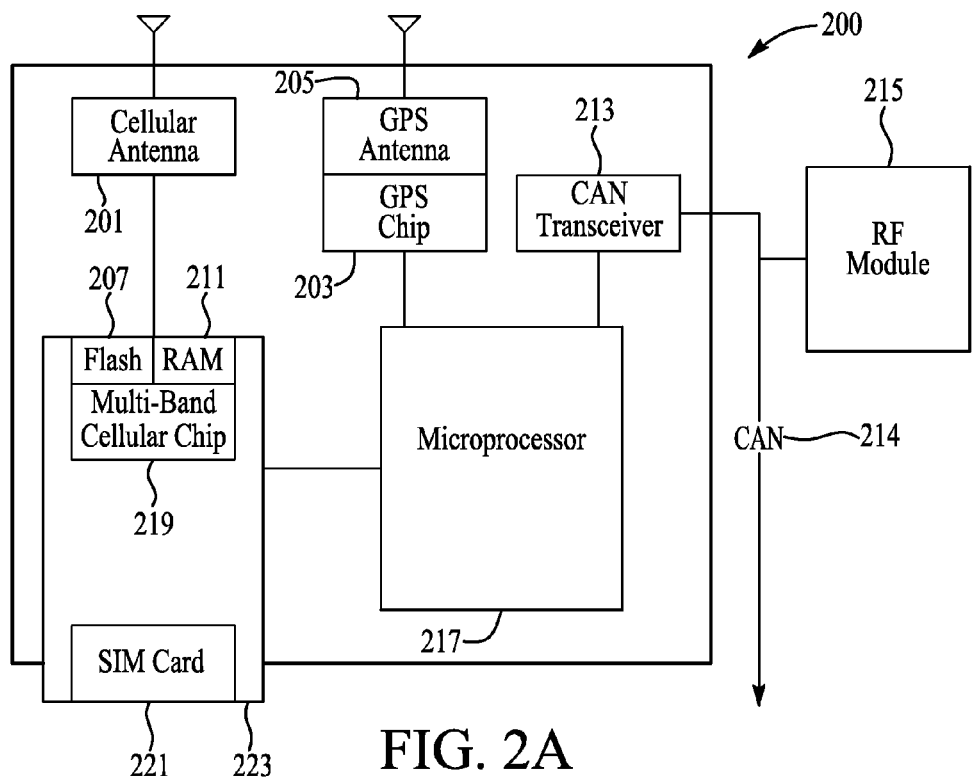
FIGS. 2a-d show illustrative examples of vehicle-based communication devices that provide communication to a remote network according to one of the various embodiments.

FIG. 2a shows an illustrative example of a communication module 200 combined with a GPS module, wherein a cellular module and GPS are on different boards.

In this illustrative embodiment, a communications module 200 can include a cellular (e.g., and without limitation, GSM or CDMA) antenna 201 that communicates with a remote server over a cellular network. The received cellular signal may be sent from the cellular antenna 201 to a multi-band cellular (e.g., and without limitation, GSM or CDMA) decoder 219 that processes the received signal to produce information usable by the microprocessor 217.

In this illustrative embodiment, the multi-band cellular chip 219, including flash memory 207 and RAM 211, is installed in the module as part of a removable device 223 including a SIM card 221. The SIM card 221 may contain user identifying information that allows access to the cellular network under a particular user's plan.

Additionally, the module includes a GPS chip 203 that can process and decode a signal from the GPS antenna 205 and send this information to a microprocessor 217.

The microprocessor is also in communication with a vehicle data bus that provides access to various vehicle modules, such as RF module 215. Other modules not shown include, but are not limited to, the vehicle cluster, a remote (off-board) GPS system, a radio module, etc. Non-limiting examples of a vehicle data bus include an SAE J1850 bus, a CAN bus, a GMLAN bus, and any other vehicle data buses known in the art. For illustration purposes only, FIGS. 2a-2d are represented as using a CAN bus.

Figure 2B:
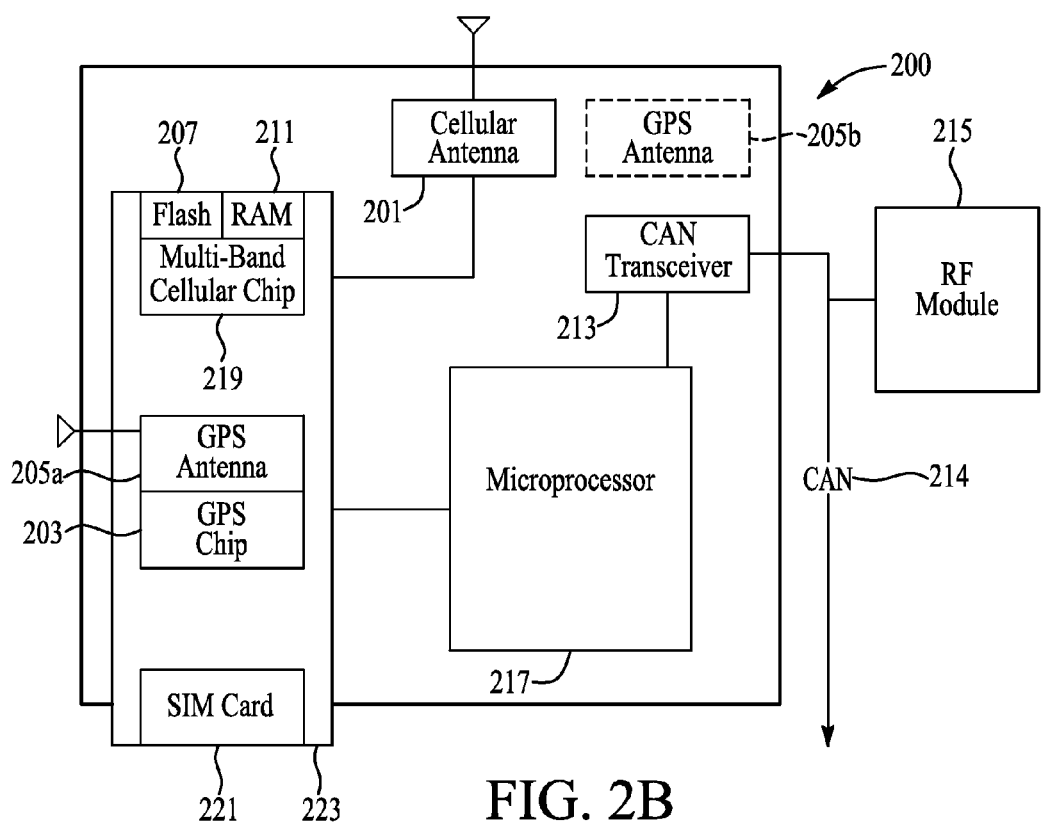

FIG. 2b shows a second exemplary embodiment in which a cellular chip and GPS are on the same board 223. In this illustrative embodiment, the removable board (this board may also be permanently attached to the module) 223 may contain the SIM card 221, a GPS module including a GPS chip 203 and a GPS antenna 205a, and the Multi-band cellular chip 219 including flash memory 207 and RAM 211.

In another embodiment, the GPS antenna 205b may be attached to the module separately from this board 223. When a signal comes in from the cellular antenna 201 and/or the GPS antenna 205b, the signal may be sent to the corresponding cellular/GPS chip 203 for processing, and then passed to the microprocessor 217. The microprocessor 217 interfaces with the CAN transceiver 213 to connect to a vehicle network 214 and vehicle modules such as RF module 215.

Figure 2C:
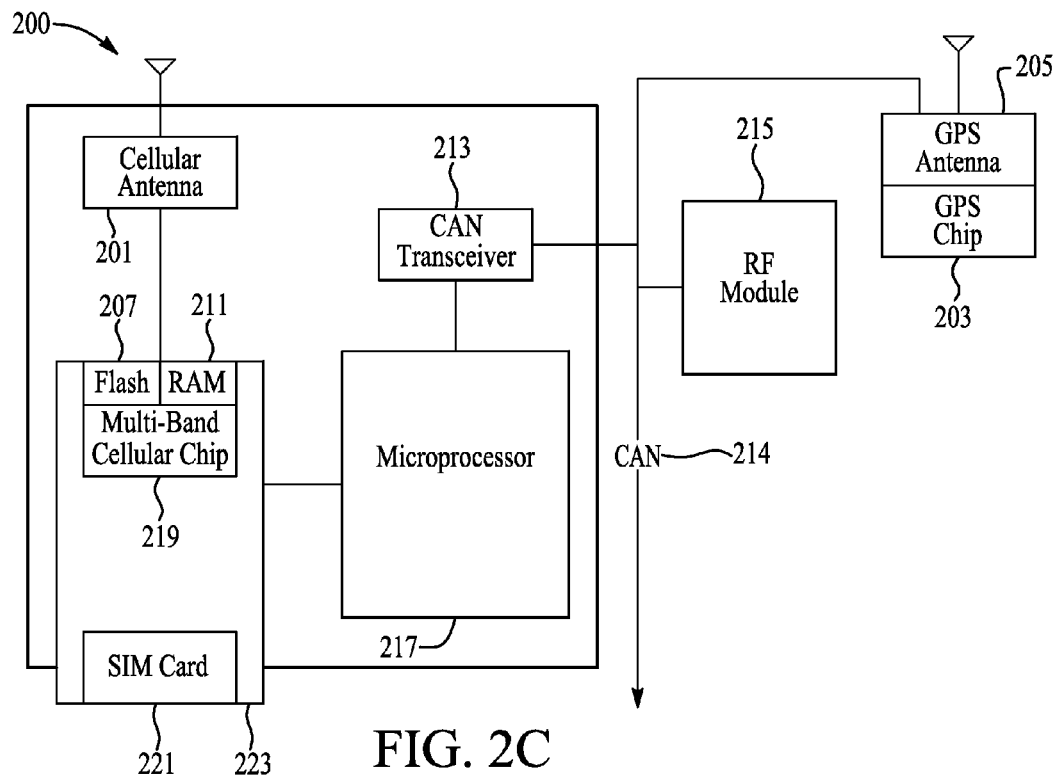

FIG. 2c shows yet another exemplary embodiment in which the cellular module is standalone. In this illustrative embodiment, the GPS module containing the GPS antenna 205 and the GPS chip 203 may connect to the microprocessor 217 through the CAN transceiver 213. Other vehicle modules, such as an RF module 215 can also connect to the microprocessor through the CAN transceiver 213.

In this illustrative embodiment, the removable board 223 may contain a SIM card 221 and a multi-band cellular chip 219, as well as a flash memory 207 and RAM 211. Signals from the cellular antenna 201 may be sent to the board 223 for processing by the multi-band cellular chip 219 before being sent to the microprocessor 217.

Figure 2D:
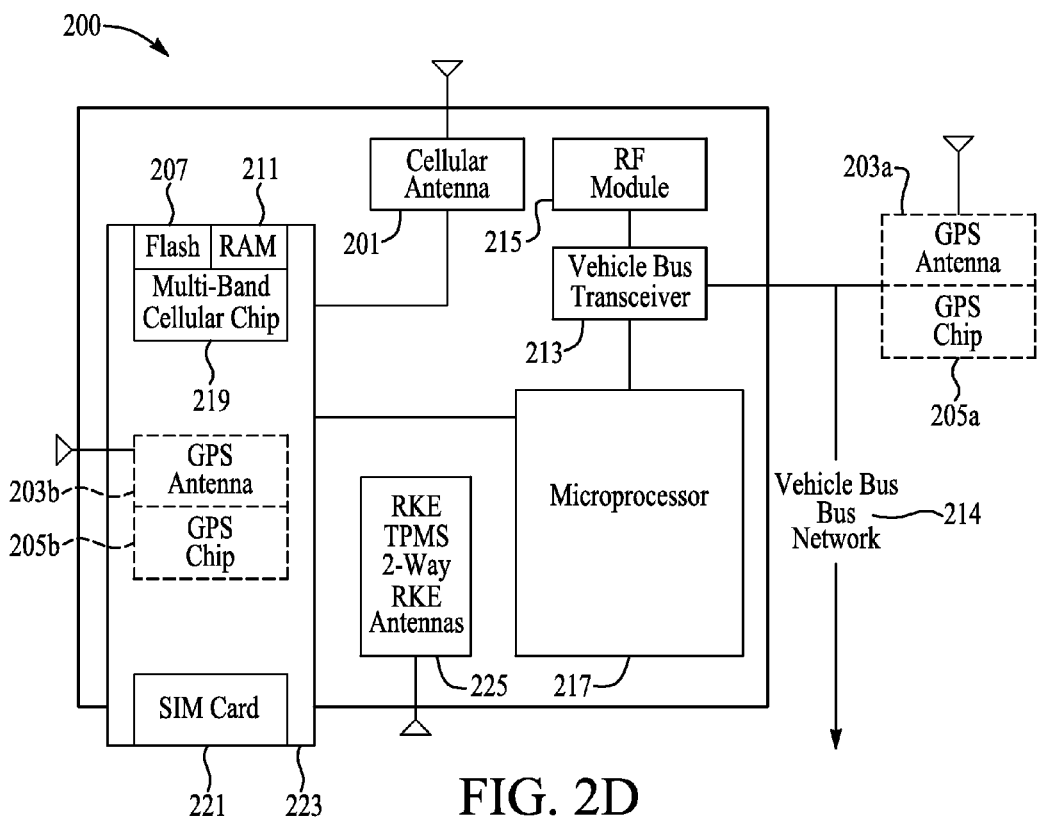

FIG. 2d shows still another exemplary embodiment in which a cellular module is combined with an RF module 215 in the communications module 200. The RF module 215 may continue to talk to the microprocessor 217 through the CAN transceiver 213. In this illustrative embodiment, the GPS module, including the GPS antenna 203a, 203b and GPS chip 205a, 205b can be located within the communications module 200 or located elsewhere in the vehicle, in which case it may communicate with the microprocessor 217 through the CAN transceiver 213.

Again, in this embodiment, the cellular antenna 201 may send a signal to the multi-band cellular 219, including flash memory 207 and RAM 211. The signal may be processed and sent to the microprocessor 217. The multi band cellular chip 219 may be located on a removable circuit board 223, which may also include a SIM card 221.

Figure 3:
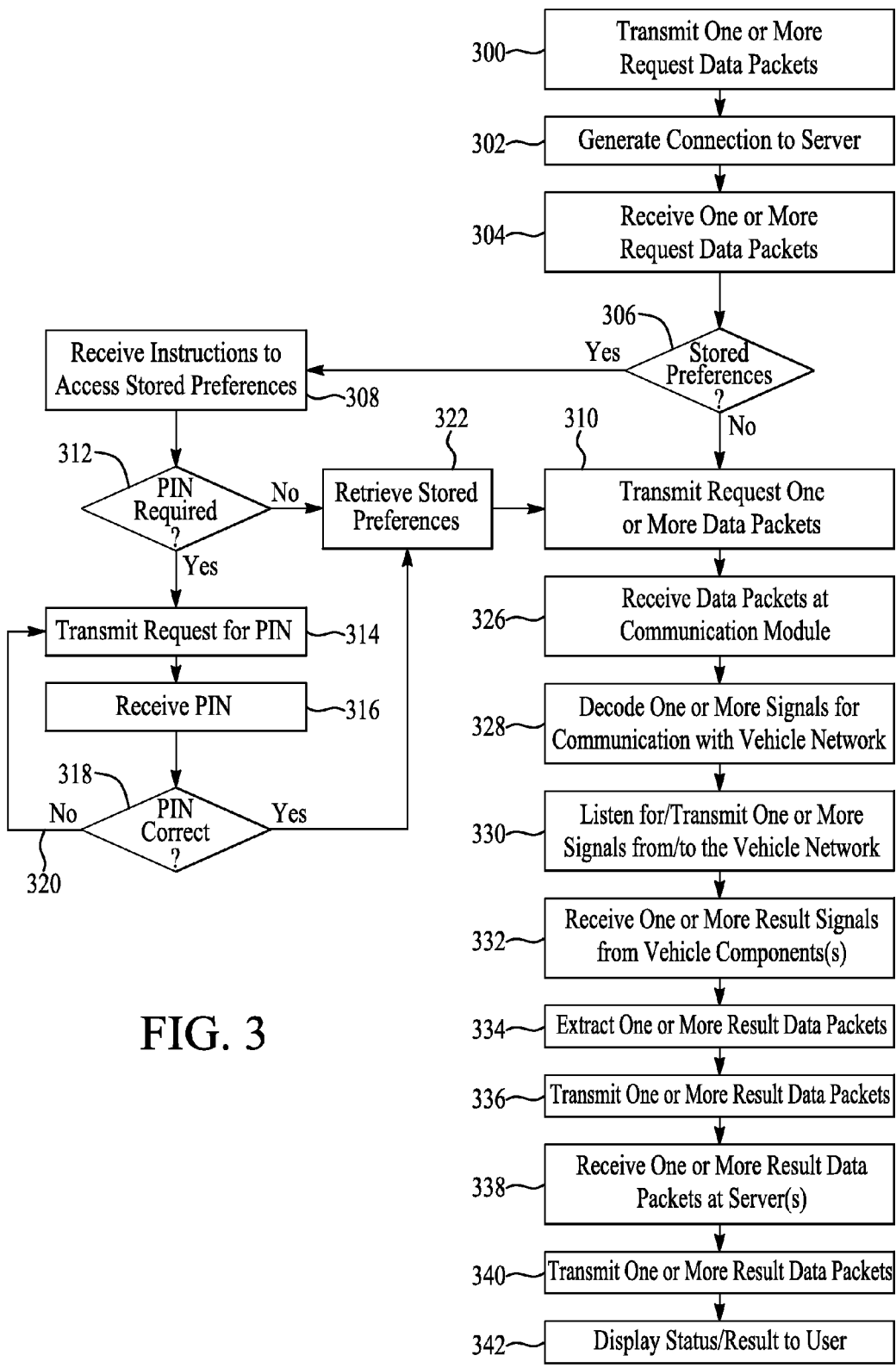
FIG. 3 illustrates a non-limiting exemplary operation of the vehicle-based communication device according to one of the various embodiments.

FIG. 3 illustrates the operation of the communication module 200 according to one of the various embodiments. The ND 103 or computer 105 may be used as a device to remotely control various features of the vehicle using software that may be downloaded to the ND 103 or computer 105, e.g., from a website (such as an OEM's website) or, as another example, come factory installed in the ND. One example of a website is SyncMyRide.com hosted by the Ford Motor Company. In one embodiment, the software may be a programmed in the JAVA language (manufactured and distributed by Sun Microsystems).

In one or more embodiments, a user may control one vehicle with multiple NDs 103 or computers 105. Additionally or alternatively, the user may use one ND 103 or computer 105 to operate components of multiple vehicles.

A user may remotely control a vehicle through one or more button presses on the keypad of the ND 103. In one embodiment, the ND 103 may include a one-key press (i.e., a "hot button") to activate and operate the remote control function of the ND 103. Alternatively or additionally, the user may remotely operate and activate vehicle features through a voice-activated command received by the ND 103. In this environment, the ND 103 may include speech recognition software for interpreting and processing commands from a user into machine readable language. In one embodiment, the speech recognition software may be programmed and/or stored to the web server. In yet another embodiment, one or more remote control commands may be transmitted by a user from the computer 105 using, e.g., a key press, voice command, or other non-limiting input.

Upon making the request (via, e.g., key button press or voice), one or more data packets may be transmitted from the ND 103 and/or computer 105 as illustrated in block 300. Non-limiting examples of data (i.e., information) transmitted in the data packets may include a mobile identification number (MIN), a customer identification number, the one or more commands triggered from the ND 103 and/or 105, and the vehicle identification number (VIN).

Before or after the data packets are transmitted, a connection may be generated with the server(s) 101 as illustrated in block 302. Once a connection to sever(s) 101 is made, the data packets may be received by the server(s) 101 as illustrated in block 304. Alternatively or additionally, a direct connection may be made between the ND 103 or computer 105 and the cellular communication module (i.e., without making a connection to server(s) 101). Accordingly, the operation of one or more embodiments may be accomplished without a server.

The server(s) 101 may process one or more received commands for transmission to the vehicle 121. Processing the data packet may include, but is not limited to, authenticating the one or more commands, authenticating the user (e.g., determining if the user is a registered user) and authenticating the cellular/mobile phone (e.g., matching the MIN to the VIN) transmitted in the data packet. In one non-limiting embodiment, the server(s) 101 may process the data packet using one or more look-up tables and validating the information in the data packets against the one or more tables. The server may be a web server.

In one embodiment, a determination may be made at the server(s) 101 if the user has any personal preferences for controlling his or her vehicle as illustrated in block 306. For example, as will be further described below, a determination may be made as to whether the user has a certain seat position preference, a seat heating preference, or a volume preference for his or her entertainment system. It should be understood that these examples are merely illustrative and non-limiting. Solely for purposes of illustration, FIG. 3 illustrates the operation based on the personal preferences being stored on the server(s) 101, although the preferences may be stored elsewhere.

The personal preferences may be stored on the server(s) 101. Alternatively or additionally, the personal preferences may be stored in the ND's 103 or computer's 105 memory (not shown). In yet another embodiment, the personal preferences may be stored at the vehicle (e.g., on the SIM card, on the microprocessor 217 of the cellular communication module 200 or in a memory module present elsewhere in the vehicle). In this latter embodiment, the server(s) 101 may simply route the data packets to the vehicle without further processing. Non-limiting examples of a personal preference may be the position of vehicle seats, the heating level of the vehicle seats, the volume level of the entertainment system, preferred radio stations, and preferred audio tracks.

Referring back to FIG. 3, if the user has personal preferences associated with one or more vehicle components, the server(s) 101 may receive instructions to access the stored preferences as illustrated in block 308. In one embodiment, the instructions may be transmitted with the one or more data packets received from the ND 103 or computer 105. The server(s) 101 may extract or read these instructions from the data packets to retrieve the stored personal preferences.

In one embodiment, a further determination may be made at server(s) 101 as to whether a personal identification number (PIN) is required to access the personal preferences or to control the one or more vehicle components as illustrated in block 312. The PIN may be stored at server(s) 101 or may be transmitted with the data packets transmitted from the ND 103 or the computer 105. If a PIN is required, the server(s) 101 may transmit a request for the PIN as illustrated in block 314. The request may be transmitted to one or more memory locations (e.g., a database) on the server(s) 101 or to the remote terminals 103, 105. The PIN may be retrieved from the server(s) 101 using, for example, a look-up table based on information such as VIN, a customer number, a MIN, or other non-limiting identifiers. It should be understood that the PIN may be retrieved in any other means known in the art and the previous example is illustrative.

The server(s) may receive the PIN as illustrated in block 316. The PIN may then be validated as illustrated in block 318. If the PIN is not correct, the server(s) 101 may retransmit the request as represented by loop 320. In one embodiment, a user may reenter a PIN a predetermined number of times (e.g., 3 or 5 times) after entering an incorrect PIN. If the PIN is correct, the server(s) 101 may retrieve the personal preferences associated with the request, as illustrated in block 322, and transmit the one or more data packets with the stored preferences to the cellular communication module as illustrated in block 310.

If a PIN is not required to access the personal preferences or if there are no stored preferences, upon receiving the one or more data packets, the server(s) 101 may transmit the one or more data packets to the cellular communication module as represented in block 310. The one or more data packets may be transmitted over the network (e.g., cellular network 113 or the internet). The cellular communication module 200 may then receive (e.g., via cellular antenna 201) the one or more data packets over the network as represented in block 326. The microprocessor 217 may listen for and/or transmit signals from/to the vehicle network 214 as represented in block 330. In one embodiment, the one or more signals may be decoded and translated at the microprocessor 217 for communication with the vehicle data bus (e.g., CAN transceiver 213 and vehicle network 214) as represented in block 328.

Through the vehicle data bus, the microprocessor 217 may communicate with the one or more vehicle components the conditions of which are being controlled. For example, the vehicle data bus may be in communication with a remote start system of the vehicle for accomplishing remote start and shut off of the vehicle.

As will be described below, the user may receive a confirmation at ND 103 and/or computer 105 that the vehicle has started or been shut off. The confirmation may be received as a text message, SMS message, or email.

As another non-limiting example, a user may also lock and unlock a vehicle from a remote terminal 103 and/or 105 using one or more embodiments described above. Again, the user may receive an e-mail, SMS, or text confirmation at ND 103 and/or computer 105 that the vehicle is locked or unlocked.

In one embodiment, a request may be made from the ND 103 and/or computer 105 to activate/operate an intelligent double lock system. Non-limiting examples of benefits achieved by a double lock system may include greater theft protection and protection for passengers (e.g., preventing a child from opening the door). The user may be in the vicinity of the vehicle when activating the double locking system. Additionally, or alternatively, the user may receive a video of the vehicle and, upon receipt, may engaged the double locking system. Once the vehicle has been locked or unlocked, a confirmation message may be sent back to the user and displayed on his or her remote terminal 103 and/or 105 display. The confirmation may be received as a text message, SMS message, or email.

In some embodiments, a user may also control other features of the vehicle doors. Non-limiting examples include power sliding doors, power windows, the sunroof, the liftgate, and the trunk. A user may control one or more of these features individually or globally (e.g., control a number of vehicle features through a one-key press).

In one embodiment, there may be a number of protections associated with remotely controlling the vehicle to prevent, e.g., accidental activation by a child. For example, the user may use a PIN entered and transmitted from his or her ND 103 and/or computer 105 as described above. As another non-limiting example, the user may select this option from a user interface on his or her ND 103 and/or computer 105 (e.g., from a menu option).

Figure 4:
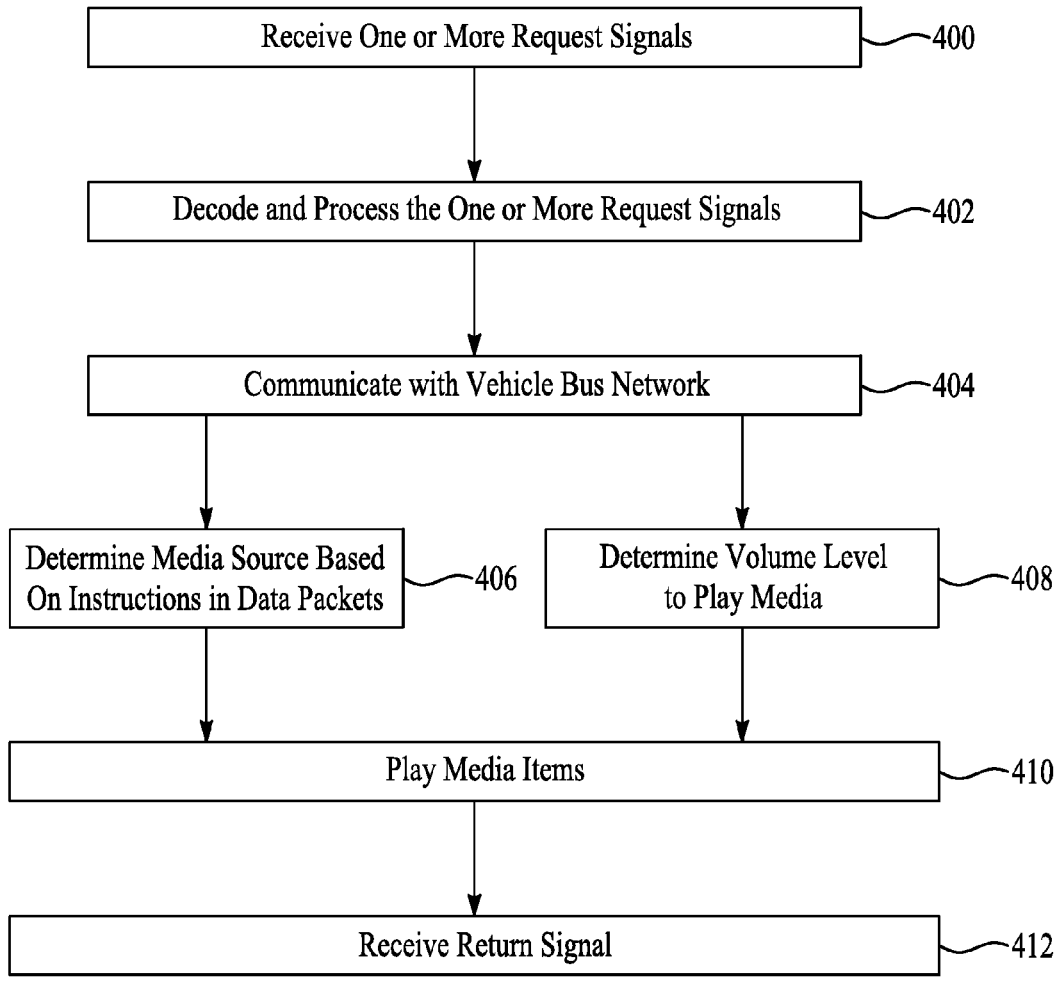
FIG. 4 illustrates the operation of one of the various aspects of the system and method for remotely controlling vehicle components from a nomadic communication device or computer according to one of the various embodiments.

FIG. 4 illustrates operation for controlling the one or more vehicle components according to one of the various embodiments. It should be understood that while FIG. 4 is illustrated from the perspective of controlling the entertainment system, the operation is applicable in other contexts (e.g., controlling the seat position, controlling the seat heating system, controlling the locking system, etc).

As illustrated in FIG. 4, a user may remotely control a vehicle's entertainment system (e.g., radio, CD-player, DVD-player, etc). Non-limiting examples of control may include powering on/off, volume setting, station/channel setting, and audio track settings. In one embodiment, communication between the ND 103 and/or computer 105 and the vehicle's entertainment system may be via a cellular network. Alternatively, wireless communication may be via BLUETOOTH. In yet another embodiment, communication may be over an 802.11g (i.e., WiFi) or WiMax network.

The user may control the entertainment system through a graphical user interface representing the entertainment system, for example. Alternatively or additionally, the user may select one or more selectable buttons from the ND 103 and/or computer 105. As illustrated in block 400, the communication module 200 may receive the one or more signals, for example, at the cellular chip 219 or the microprocessor 217. In one embodiment, the signals may be decoded for interpretation by the vehicle (e.g., the entertainment system component) at the microprocessor 217 as illustrated in block 402.

The microprocessor 217 may communicate with the CAN transceiver 213 for receiving one or more return signals from the vehicle entertainment system via the vehicle network as illustrated in block 404. The return signals may include on or more operating status codes transmitted from the entertainment system component. The data bus codes may or may not be proprietary.

In one embodiment, based on the instructions received in the data packets (i.e. signals), the cellular communication module 200 may determine the media source, as illustrated in block 406, and/or the volume level to play the media items as illustrated in block 408. The cellular communication module 200 may communicate these instructions to the CAN transceiver 213. The CAN transceiver 213 may send a message to the vehicle entertainment system component for accomplishing the instruction. It should be understood that the determination may vary based on the component being controlled and the instant example is for illustration purposes. The entertainment system may then play the one or more media items according to the instructions in the one or more signals as illustrated in block 410.

Additionally, if the user included his or her personal preference for playing media items (which may, but not necessarily, include the media source and/or volume level), the entertainment system may be controlled according to this preference as described above. A return signal may be received by the cellular communication module 200, as illustrated in block 412. The return signal may include one or more operating status identifiers that are processed and decoded by the microprocessor 217 for transmission to the ND 103 and/or computer 105. The communication module 200 may then transmit the return signal to the server(s) 101 for receipt by the remote terminals 103 and/or 105.

The return signal may include a status of the one or more vehicle components. For example, the return signal may report that the entertainment system was activated and/or controlled according to the user's instructions/request. As another example, the return signal may indicate that the seats were positioned successfully or unsuccessfully. Accordingly, the communication module 200 may transmit the return signal to the ND 103 and/or 105 where the status of the component may be displayed, for example, on a graphical user interface.

In certain embodiments, a user may remotely control the entertainment center through predetermined settings (e.g., pre-installed by the OEM). These additional parameters may be transmitted with the data packets transmitted from the ND 103 and/or computer 105, stored on the server(s) 101, or stored at the vehicle.

For example, a user may control the volume setting by selecting at least one of a number of volume settings. In one embodiment, a non-limiting example of volume setting may be selecting a volume level by percentage level of volume (e.g., one of a 25%, 50%, 75%, or 100% volume level setting). Thus, if the user wants to hear music at 50% of the volume level, then he or she can select 50% from the ND and/or terminal. Other non-limiting examples may include other numerical setting representations (e.g., 1 to 4 with 1 being the lowest and 4 being the highest) or a graphical representation (e.g., a vertical or horizontal bar representing the level of volume).

In other embodiments, the entertainment system may be more liberally controlled. For example, the user interface on the ND and/or terminal may include a graphical representation of a volume up/volume down function. Another non-limiting example for control may be through a tap up/tap down button on the user interface. In one embodiment, the interface may also include a "seek" button for searching media items played through the system (e.g., searching stations and/or audio tracks from a CD). Thus, a user may remotely control the operation of his or her vehicle's entertainment system without physically being in the vehicle.

A user may also control one or more vehicle seat positions remotely from his or her ND 103 and/or computer 105 using one or more embodiments of the operation as described above. The user may control seat positioning by directly controlling from the ND 103 and/or 105 (e.g., through a graphical user interface representing the vehicle seats) the position of the seats. Alternatively or additionally, the user may select one or more selectable buttons from the ND 103 and/or computer 105. If the user included his or her personal preference for a seat position (e.g., seat selection, position, etc), the seat may be positioned according to this preference as described above.

A user may also accomplish climate control of the vehicle from the ND 103 and/or computer 105, including the climate of the internal cabin and heating of the vehicle seats, using the operation as describe above in one or more embodiments. In one embodiment, the system may make a determination as to which and how many seats to control. This determination may be made at block 404 or 406 of FIG. 4. The system may also determine at which temperature level to heat the seat. This determination may be made at block 404 or 406. The determination may be based on instructions inputted from the user at ND 103 and/or 105. The determination may also be made based on predetermined instructions stored in at least one of the ND 103, the computer 105 and/or the vehicle.

Other non-limiting features that may be controlled and/or personalized may include radio station presets and control of windows. A user may additionally customize the audible sounds for locating a vehicle (e.g., the vehicle's "chirp"). Non-limiting customizations may include the type of sound (e.g., a chirp or a horn honk) and the time intervals in which the sounds may be transmitted. In one non-limiting embodiment, the intervals may be set in second or minute intervals.

A user may also activate and control his or her vehicle lights from his or her ND 103 and/or computer 105. In one embodiment, a user may want to control the operation of the vehicle's hazard lights. For example, if a user has temporarily parked his or her vehicle in front of a building, he or she may desire to turn on the vehicle's hazard lights while he or she is in the building and away from the vehicle. Using one or more embodiments, he or she may do so without having to reenter the vehicle.

Referring back to FIG. 3, the cellular communication module 200 may receive the one or more result signals transmitted from the one or more vehicle components as illustrated in block 332 via the vehicle bus. The communication module 200 may extract one or more return data packets from the return signal for transmission to the ND 103 and/or computer 105 as in block 334. Transmission may be accomplished by the cellular antenna 201 over network 115. Furthermore, the cellular communication module 200 (e.g., the microprocessor 217) may process the return data packets for interpretation by the server(s) 101 and/or the remote terminal 103, 105. This processing may occur, for example, using a look-up table.

The data packets may be transmitted to the remote terminals 103 and/or 105 as illustrated in block 336. In one embodiment, the return data packets may be routed through server(s) 101, as illustrated in block 338, which may or may not further process the data packets for transmission to the remote terminals 103 and/or 105. The result signal(s) may be transmitted to and received by the ND 103 and/or computer 105 as illustrated in block 340.

A report may be generated and displayed to the user showing, for example, the status of the one or more controlled vehicle components as illustrated in block 342. For example, in one embodiment, the report may show that two vehicle seats have been positioned and that the driver's seat has been heated.

Other non-limiting features of a vehicle that may controlled using one or more embodiments of the present invention (as described above) may include panic activation/deactivation and alarm activation/deactivation. A user may also set his or her vehicle to activate one or more of the following non-limiting theft control precautions: set the speed to a maximum (e.g., 5 miles per hour), shut the engine down, cause a gradual slow down of the vehicle, honk the horn, flash lights, or turn off the vehicle's start to prevent restart.

In some embodiments, vehicle 121 may include a microphone (e.g., to receive voice-activated commands from a passenger in the vehicle). The user may remotely activate the microphone from a ND 103 and/or computer 105 using one or more embodiments described above. Furthermore, sounds or speech received by the ND 103 and/or computer 105 may be recorded.

In one embodiment, a user may also control objects external to the vehicle from the ND 103 and/or computer 105. For example, the ND 103 and/or computer 105 may be used to control aspects of a home environment. For example, the ND and/or terminal may be used as a garage door opener. Alternatively, the cellular communication module 200 embedded in the vehicle may be used to control the external components (e.g., the garage door). The user may be able to accomplish this control from, for example, the center stack of the vehicle (not shown) via a button press or input at the center stack. In this non-limiting embodiment, one or more data packets may be transmitted from the cellular communication module 200 to one or more external components. The data packets may be routed through server(s) 101 for including, for example, personal preference information or identification information in the data packets. For example, the server(s) 101 may conduct a database table look up in order to verify identification information obtained from the SIM card 221 and authenticate the transmission of the data.

The data packets may then be transmitted to the one or more external components. Upon operating the external components, a return signal may be transmitted to the ND 103 and/or computer 105 which may include, for example, a status of the external components (e.g., the garage door has been successfully opened).

It should be understood that the user may also control other external features including, but not limited to, the lights within the home and the furnace. As would be known to one of ordinary skill in the art, Z-wave connectivity can be achieved via the ND interface and the Visor GDO.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A computer-implemented method for remotely controlling one or more vehicle components, the computer-implemented method comprising:
    receiving over a telecommunications network one or more first signals originating from a nomadic wireless communication device (NWCD), the one or more first signals including one or more remote operation instructions including at least one instruction for remotely operating a vehicle entertainment system component;
    receiving user identification and verification information transmitted from the NWCD to the vehicle entertainment system, corresponding to a user of the NWCD and usable to authenticate the user's right to request execution of the one or more remote operation instructions;
    executing the one or more remote operation instructions;
    receiving one or more operation status identifiers transmitted over a vehicle data bus from at least the vehicle entertainment system component;
    based on the one or more operation status identifiers, determining an operating status of at least the vehicle entertainment system component;
    generating, via the vehicle entertainment system, at least one second signal including at least one operation status message and at least one instruction for displaying the operation status message at the NWCD; and
    transmitting the at least one second signal to the at least one remote NWCD for display.

2. The computer-implemented method of claim 1 wherein the remote operation instructions include instructions for remotely operating at least one other vehicle component and the method further comprises performing the method with respect to the at least one other component.

3. The computer-implemented method of claim 2 wherein the at least one other component is an audible vehicle locator system.

4. The computer-implemented method of claim 3 wherein the audible vehicle locator system is remotely operated according to a user preference.

5. The computer-implemented method of claim 1 wherein the at least one remote operation instruction includes at least one media source selection instruction and wherein the at least one operation status message includes a message that the selected media source is being remotely operated.

6. The computer-implemented method of claim 5 wherein the media source is selected from the group consisting of a radio, a compact disc player, a tape player, a digital video disc (DVD) player, and a personal media player.

7. The computer-implemented method of claim 1 wherein the at least one remote operation instruction includes at least one volume level selection instruction and wherein the at least one operation status message includes a message identifying the volume at which a media item is being played.

8. The computer-implemented method of claim 7 wherein the volume level selection is a predetermined selection by a user from the NWCD and the at least one volume level selection instruction includes an instruction to play the media item according to the user's predetermined selection.

9. The computer-implemented method of claim 8 wherein the predetermined volume level selection is a user-defined selection.

10. A computer-implemented system for remotely controlling one or more vehicle components, the computer-implemented system comprising:
    a cellular communication module within a vehicle communicating with one or more remote terminals over a telecommunications network, the cellular communication module being configured to:
    receive one or more first signals originating from the one or more remote terminals, the one or more first signals including one or more remote operation instructions including at least one instruction for remotely operating a vehicle entertainment system component;
    receive user identification and verification information transmitted from the NWCD to the vehicle entertainment system, corresponding to a user of the remote terminal and usable to authenticate the user's right to request execution of the one or more remote operation instructions;
    transmit the one or more remote operation instructions for execution wherein the at least one instruction is executed by a vehicle;
    receive one or more operation status identifiers transmitted over a vehicle data bus from at least the vehicle entertainment system component;
    based on the one or more operation status identifiers, determine an operating status of at least the vehicle entertainment system component;
    generate at least one second signal including at least one operation status message and at least one instruction for displaying the operation status message at the one or more remote terminals; and transmit the at least one second signal to the one or more remote terminals for display.

11. The computer-implemented system of claim 10 wherein the one or more remote operation instructions include at least one instruction for controlling one or more features of the vehicle entertainment system.

12. The computer-implemented system of claim 11 wherein the one or more features of the vehicle entertainment system includes at least one of a volume control feature, a radio scan feature, a track selection feature, a channel selection feature, a play feature, and a stop feature.

13. The computer-implemented system of claim 10 wherein the one or more remote operation instructions further includes at least one instruction for remotely operating at least one other vehicle component wherein the cellular communication module is further configured to perform each step with respect to the at least one other component.

14. The computer-implemented system of claim 13 wherein the at least one other component is a vehicle seat heating system component.

15. The computer-implemented system of claim 13 wherein the at least one other component is a vehicle seat positioning system component.

16. The computer-implemented system of claim 13 wherein the at least one other component is a vehicle double locking system component.

17. The computer-implemented system of claim 13 wherein the at least one other component is a hazard lighting system component.

18. The computer-implemented system of claim 10 wherein the one or more remote terminals is a nomadic wireless communication device (NWCD) or a personal computer (PC).

19. A computer-implemented system for remotely controlling one or more vehicle components, the computer-implemented system including one or more servers in communication with one or more remote terminals over a telecommunications network, the one or more servers being configured to:

receive one or more first signals originating from the one or more remote terminals, the one or more first signals including one or more remote operation instructions including at least one instruction for remotely operating a vehicle entertainment system component;

receive user identification and verification information transmitted from the NWCD to the vehicle entertainment system, corresponding to a user of the remote terminal and usable to authenticate the user's right to request execution of the one or more remote operation instructions;

transmit the one or more remote operation instructions for execution by a vehicle;

receive one or more operation status identifiers from the vehicle pertaining to the vehicle entertainment system component, the one or more second operation status identifier originating from a vehicle data bus and identifying a current status of the component;

generate at least one second signal including at least one operation status message derived from the one or more operation status identifiers and at least one instruction for displaying the operation status message at the one or more remote terminals; and transmit the at least one second signal to the one or more remote terminals for display.

20. The computer-implemented system of claim 19 wherein the one or more terminals are one or more nomadic wireless communication devices.

* * * * *